(12) United States Patent
Kothari et al.

(10) Patent No.: US 10,489,740 B2
(45) Date of Patent: Nov. 26, 2019

(54) OPTIMAL REALLOCATION OF INVENTORY UNDER CAPACITY VIOLATIONS

(71) Applicant: WAL-MART STORES, INC., Bentonville, AR (US)

(72) Inventors: Rishabh Kothari, San Francisco, CA (US); Arash Asadi-Shahmirzadi, San Bruno, CA (US); Vvs Varaprasad Nagalla, San Bruno, CA (US); Zhiwei Qin, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 513 days.

(21) Appl. No.: 14/949,563

(22) Filed: Nov. 23, 2015

(65) Prior Publication Data
US 2017/0147964 A1    May 25, 2017

(51) Int. Cl.
*G06Q 10/08* (2012.01)
*G06Q 30/02* (2012.01)

(52) U.S. Cl.
CPC ....... *G06Q 10/087* (2013.01); *G06Q 30/0202* (2013.01)

(58) Field of Classification Search
CPC .. G06Q 10/087; G06Q 30/0202; G06Q 10/08; G06Q 10/083; G06Q 10/06315
See application file for complete search history.

(56) References Cited

U.S. PATENT DOCUMENTS

| | | | | |
|---|---|---|---|---|
| 7,139,637 | B1* | 11/2006 | Waddington | G06Q 10/04 700/216 |
| 8,386,639 | B1* | 2/2013 | Galvin | G06Q 30/02 370/270 |
| 8,666,791 | B1* | 3/2014 | Fedele | G06Q 10/06 705/7.11 |

(Continued)

OTHER PUBLICATIONS

Jayaraman Vaidyanathan and Ross Anthony, 2003, A simulated annealing methodology to distribution network design and management, European Journal of Operational Research 144, pp. 629-645.*

(Continued)

*Primary Examiner* — Matthew S Gart
*Assistant Examiner* — Stephen S Swartz
(74) *Attorney, Agent, or Firm* — Bryan Cave Leighton Paisner LLP

(57) ABSTRACT

A method of reallocating inventory in a fulfillment network is disclosed herein. The fulfillment network can include a plurality of distribution centers. An allocation plan can be created in a one of a variety of different manners, where the allocation plan involves allocating an item to one or more distribution centers in the fulfillment network. Thereafter, the allocation plan can be analyzed for feasibility. If the allocation plan is not feasible, each distribution center in the allocation plan can be analyzed to determine if using the distribution center is feasible. If the distribution center cannot be used, another distribution in the same cluster of distribution centers is examined for feasibility. This process is repeated for each distribution center in the allocation plan.

(Continued)

Once an alternative allocation plan has been developed in this manner, items can be allocated. Existing inventory can be taken into account in the allocation plan.

24 Claims, 7 Drawing Sheets

(56) References Cited

U.S. PATENT DOCUMENTS

| | | | | |
|---|---|---|---|---|
| 2003/0055750 A1* | 3/2003 | Menninger | ............ | G06Q 10/06 705/28 |
| 2011/0264485 A1* | 10/2011 | Notani | .................... | G06Q 10/06 705/7.31 |
| 2012/0150700 A1* | 6/2012 | Babar | .................... | G06Q 10/08 705/28 |

OTHER PUBLICATIONS

Melo M.T., Nickel S., Saldanaha-da-Gama F, 2009, Facility location and supply chain management—a review, European Journal of Operational Research, vol. 196, pp. 401-412.*

* cited by examiner

OPTIMAL REALLOCATION OF INVENTORY UNDER CAPACITY VIOLATIONS

TECHNICAL FIELD

This disclosure relate's generally to product distribution systems, and relates more particularly to managing inventory across a fulfillment network of distribution centers.

BACKGROUND

Online retail has become mainstream, which has allowed customers to order an increasing number of products online and receive direct shipments of the items they order. These products are shipped from warehouses known as distribution centers. Although an online retailer may market and sell many distinct items, known as stock keeping units (SKUs), each distribution center generally has a limited capacity and, thus, can carry only a limited number of SKUs. As such, stocking every SKU at every distribution center is generally unfeasible. In general, SKUs are placed in distribution centers in an attempt to minimize outbound shipping costs, guarantee service levels, and prevent the overloading of any one distribution center. While there is usually a plan for the distribution of SKUs to distribution centers, it would be desirable to have a method and system of coping with changes to a distribution network.

BRIEF DESCRIPTION OF THE DRAWINGS

To facilitate further description of the embodiments, the following drawings are provided in which.

Figure 1:
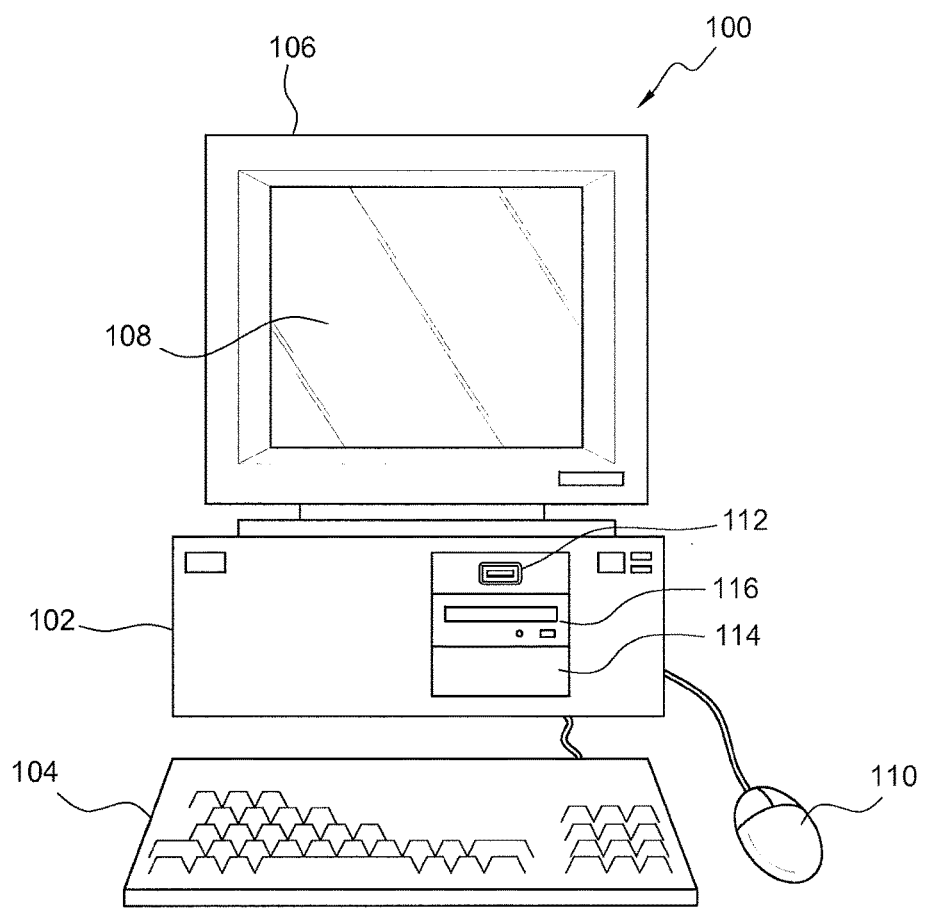
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a method. The method can include receiving an allocation plan for an item in a fulfillment network, the fulfillment network comprising a plurality of clusters of distribution centers, each cluster of distribution centers comprising one or more distribution centers; determining if the allocation plan is feasible; if the allocation plan is feasible, allocating the item based on the allocation plan; if the allocation plan is not feasible, determining an alternative allocation plan; and after determining the alternative allocation plan, allocating the item to one or more of the distribution centers based on the alternative allocation plan.

A number of embodiments can include a system. The system can comprise one or more processing modules; and one or more non-transitory memory storage modules storing computing instructions configured to run on the one or more processing modules. The computing instructions can be configured to perform the acts of: receiving an allocation plan for an item in a fulfillment network, the fulfillment network comprising a plurality of clusters of distribution centers, each cluster of distribution centers comprising one or more distribution centers; determining if the allocation plan is feasible; if the allocation plan is feasible, allocating the item based on the allocation plan; if the allocation plan is not feasible, determining an alternative allocation plan; and after determining the alternative allocation plan, allocating the item to one or more of the distribution centers based on the alternative allocation plan.

Various embodiments include a method. The method can comprise: receiving an allocation plan for an item in a fulfillment network, the fulfillment network comprising a plurality of distribution centers, each cluster of distribution centers comprising one or more distribution centers, the allocation plan comprising placing one or more copies of each item into a first distribution center and one or more copies of each item into a second distribution center; determining an existing inventory at the first distribution center and an existing inventory at the second distribution center; adjusting the allocation plan based on the existing inventory at the first distribution center and an existing inventory at the second distribution center; and allocating the item based on the adjusted allocation plan.

Figure 2:
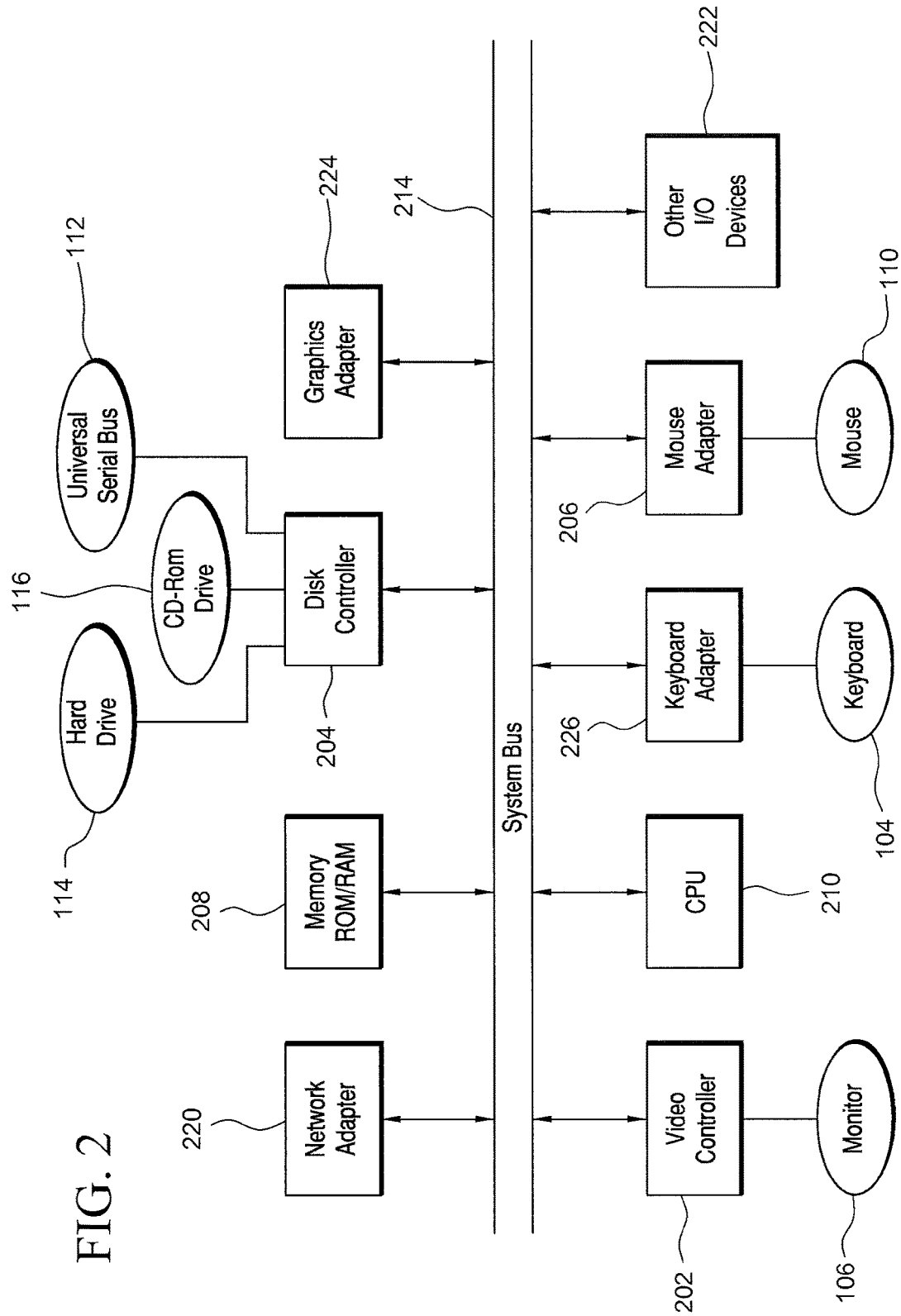
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 comprises chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM or DVD drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone or a tablet. In certain additional embodiments, computer system 100 may comprise an embedded system.

Figure 3:
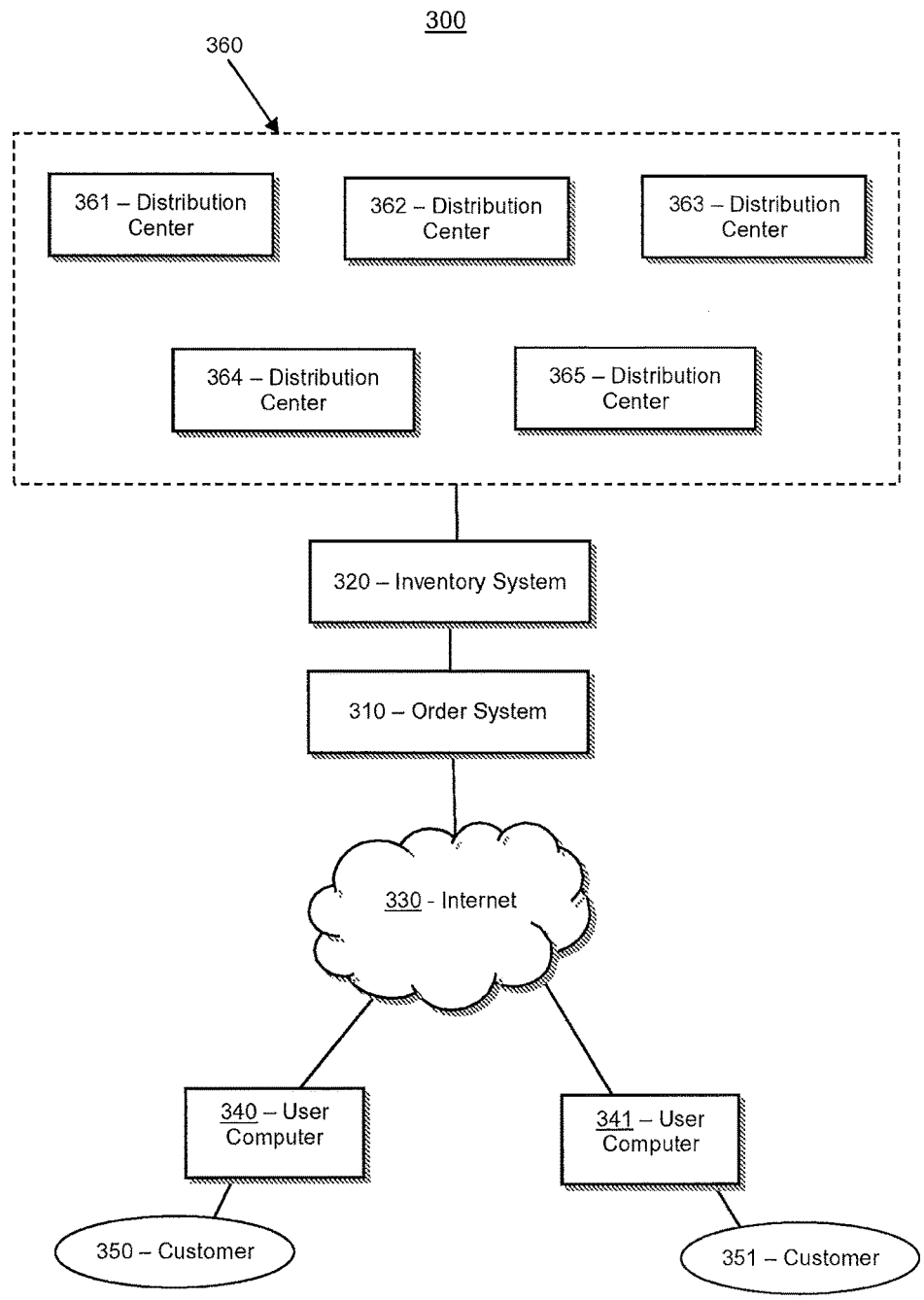
FIG. 3 illustrates a block diagram of an exemplary online retail system, portions of which can be employed for determining an inventory mirroring plan, according to an embodiment.

Turning ahead in the drawings, FIG. 3 illustrates a block diagram of an exemplary online retail system 300, portions of which can be employed for determining an inventory mirroring plan, according to an embodiment. Online retail system 300 is merely exemplary of a system in which an online retailer can receive and fulfill online orders, and embodiments of the online retail system and elements thereof are not limited to the embodiments presented herein. The online retail system and elements thereof can be employed in many different embodiments or examples not specifically depicted or described herein. In some embodiments, certain elements or modules of online retail system 300 can perform various procedures, processes, and/or activities. In other embodiments, the procedures, processes, and/or activities can be performed by other suitable elements or modules of online retail system 300.

In a number of embodiments, online retail system 300 can include a fulfillment network 360. In various embodiments, fulfillment network 360 can include one or more distribution centers, such as distribution centers (also known as fulfillment centers) 361, 362, 363, 364, and 365. In various embodiments, there can be 10, 15, 20, 30, 40, 50, or another suitable number of distribution centers. In some embodiments, online retail system 300 can include an order system 310 and/or an inventory system 320. Inventory system 320 and/or order system 310 can each be a computer system, such as computer system 100 (FIG. 1), as described above, and can each be a single computer, a single server, or a cluster or collection of computers or servers, or a cloud of computers or servers. In some embodiments, inventory system 320 can track the distinct items (e.g., stock keeping units (SKUs)) which can be ordered through the online retailer and which can be housed at the distribution centers (e.g., 361-365) of fulfillment network 360.

In many embodiments, inventory system 320 can be in data communication with order system 310. In certain embodiments, inventory system 320 and order system 310 can be separate systems. In other embodiments, inventory system 320 and order system 310 can be a single system. In various embodiments, order system 310 can be in data communication through Internet 330 with user computers (e.g., 340, 341). User computers 340-341 can be desktop computers, laptop computers, smart phones, tablet devices, and/or other endpoint devices, which can allow customers (e.g., 350-351) to access order system 310 through Internet 330. In various embodiments, order system 310 can host one or more websites, such as through one or more web servers. For example, order system 310 can host an eCommerce website that can allow customers (e.g., 350, 351) to browse and/or search for products, to add products to an electronic shopping cart, and/or to purchase products by completing an online order, in addition to other suitable activities. In other embodiments, order system 310 can utilize mobile apps that allow customers (e.g., 350, 351) to browse and/or search for products, to add products to an electronic shopping cart, and/or to purchase products by completing an online order, in addition to other suitable activities. A combination of mobile apps and websites also can be used.

In various embodiments, an online order for an item submitted by a customer (e.g., 350, 351) can result in a shipment to the customer (e.g., 350, 351) from one of the distribution centers (e.g., 361-365), such as the distribution center that has the item stocked in its inventory and that is located the closest to the delivery address of the customer (e.g., 350, 351) that submitted the online order. In several embodiments, one or more of the distribution centers (e.g., 361-365) can each have a limited capacity and can carry some of the SKUs, but not all of the SKUs, that are available for sale through order system 310. As such, stocking every SKU at every distribution center (e.g., 361-365) can be unfeasible, and the SKUs can instead be stocked strategically in a process sometimes called mirroring. Mirroring is discussed in more detail in U.S. patent application Ser. No. 14/466,751, filed Aug. 22, 2014, the contents of which are incorporated herein by this reference.

In mirroring, the distribution centers can be "mirrored" to stock the inventory of each SKU as close as possible to specific customer locations, subject to constraints, such as limited capacity of the distribution centers (e.g., 361-365). In some embodiments, various factors can determine the cost of shipping a SKU, such as demand volume, shipping cost sensitivity, weight, geo-demand distribution, the number of distribution centers (e.g., 361-365), and/or the capacity of the distribution centers (e.g., 361-365). For example, if a SKU has low sales volume (a "low-velocity" SKU) or very regional demand spread, it might not necessarily warrant a high mirroring because the additional fulfillment cost and time can be small. By contrast, a SKU having high sales volume (a "high-velocity" SKU) with wide geo-demand spread can be stocked at more distribution centers (e.g., 361-365) in order to deliver the ordered inventory of the SKU within a predetermined time, to lower shipping costs, and/or to meet other service-level targets. In many embodiments, inventory system 320 can determine how many distribution centers (e.g., 361-365) at which to mirror each distinct item (e.g., SKU).

In some embodiments, shipping from the distribution centers (e.g., 361-365) to customers (e.g., 350, 351) can be based on a shipping zone system. The shipping zone system can be a representation of shipping distance. For example, a package shipped within the same state can be a 2-zone shipment, whereas a cross-continental shipping can be an 8-zone shipment. In many embodiments, a rate card is a price list of shipping offered by a carrier. The shipping zone distance can represented by zone distance (l). In a number of embodiments, a rate card can state a unit shipping cost for a given combination of zone distance (l) and a weight (w) of the shipped item. The rate card can be a table function c(l, w) that returns the unit shipping cost based on the zone distance and weight of the SKU.

In many embodiments, determination of an inventory mirroring plan by inventory system 320 can be based on one or more assumptions. For example, fulfillment network 360 can be well established, and the number and locations of the distribution centers (e.g., 361-365) can have good geographic coverage such that mirroring decisions can be meaningful. As another example, the inventory holding cost can be insignificant compared to shipping cost.

In many embodiments, order system 310 can make available for sale a set of distinct items (e.g., SKUs), each of which can be represented by distinct item (i). In some embodiments, the set of distinct items can be each SKU in the catalog of items sold through order system 310. In a number of embodiments, the set of distinct items can be a subset of the catalog, such as general merchandise items, which can exclude such items as clothes, jewelry, tissue paper, etc. In a number of embodiments, an overall approach can be to solve for optimal inventory mirroring as a knapsack-type problem. The distinct items can be analogous to the items to be put into a bag, which can be analogous to the overall capacity of the distribution centers (e.g., 361-365) in fulfillment network 360, which can have a finite capacity. There can be a cost (or value) associated with each distinct item (i) for each mirroring factor, which can represent the number of the distribution center (e.g., 361-365) in fulfillment network 360 to stock with distinct item (i). The objective can be to minimize the total cost, while staying within the total capacity of fulfillment network 360. Hence, the "value" of mirroring a distinct item (i) in a selected number of distribution centers (e.g., 361-365) can be the negative of the expected resulting optimal shipping cost for fulfilling the overall demand of the distinct item (i), assuming cost is represented as a negative value. A challenging component of this framework can be to determine the costs. Computing the exact optimal fulfillment cost associated with a given distinct item (i) and mirroring factor combination can be intractable and/or impossible when there are a very large number of distinct items (i) and/or a large number of distribution centers (e.g., 361-365), and so certain approximations can be used.

In some embodiments, each location can be represented by a demand zone (z), which can collectively comprise a set of demand zones that cover a geographical area, such as the contiguous United States. For example, each demand zone (z) can represent each distinct three-digit ZIP code (e.g., the first three digits of the five-digit ZIP code) in the contiguous United States. In other embodiments, the three-digit ZIP codes can be clustered into a smaller number of demand zones, such as 125 demand zones, as described in U.S. patent application Ser. No. 14/466,239, filed Aug. 22, 2014, the contents of which are hereby incorporated by reference in its entirety.

In a number of embodiments, a total demand for a distinct item (i) across fulfillments network 360 can be represented by $d_i$. In various embodiments, geo-demand distribution can be data that specifies the geographical spread of customer demand for each distinct item (i). Specifically, each distinct item (i) can be associated with a distribution vector whose elements can represent the percentage of demand for a particular geographical location. In various embodiments, the demand distribution can be based on the demand from the previous year, or in other words, time-static. The time-static geo-demand distribution for distinct item (i) at demand zone (z) can be denoted by $\beta_{i,z}$. In a number of embodiments, $\Sigma_z \beta_{i,z}=1$. In several embodiments, this demand distribution data can be estimated by a number of machine learning and/or statistical methods, such as a Bayesian approach described in U.S. patent application Ser. No. 14/466,239, filed Aug. 22, 2014. With the estimation of the time-static geo-demand distributions ($\beta_{i,z}$), in several embodiments of a location-specific demand ($d_{i,z}$), $d_{i,z}=d_i \beta_{i,z}$.

In many embodiments, to minimize the cost of shipping the distinct items (i), with the distinct items (i) being mirrored across a various number of distribution centers (e.g., 361-365), inventory system 320 can select a number of distribution centers (e.g., 361-365) from fulfillment network 360 for each of distinct item (i) that will minimize the cost of shipping. For example, a first distinct item can be mirrored at 5 distribution centers, a second distinct item can be mirrored at 10 distribution centers, etc. The selection of the number of distribution centers for each of the distinct items (i) can be combinatorial in nature and can be computationally intractable. To remove this intractability, inventory system 320 can cluster the distribution centers (e.g., 361-365) into distribution center clusters for each of the possible mirroring selections. For example, inventory system 320 can determine a 1-cluster profile, a 2-cluster profile, a 3-cluster profile, and so forth, to a predetermined maximum number of clusters (K). For example, in some embodiments, the predetermined maximum number of clusters (K) can be 10, 15, 20, or another suitable number. For example, in some embodiments, the clustering can reduce the number of warehouses from 33 down to a maximum of 12 clusters. Each of the clusters can have one or more distribution centers. For a number of clusters (k), the k-cluster profile can be a segmentation of the distribution centers (e.g., 361-365) into k distribution center clusters. The distribution center clustering approximation can work generally well if the geo-demand spread of a distinct item (i) is not particularly skewed.

In many embodiments, inventory system 320 can use a conventional k-medoid clustering algorithm to cluster the distribution centers (e.g., 361-365) into k distribution center clusters. The k-medoid clustering algorithm can be more robust than a k-means clustering algorithm. An additional advantage of using the k-medoid can be that the center of each distribution center cluster can be an actual distribution center (e.g., 361-365). In a number of embodiments, the features for clustering in the k-medoid clustering algorithm can be the zone distance (l) from the distribution center (e.g., 361-365) to each demand zone (z). In a number of embodiments, inventory system 320 can determine and maintain k-cluster profile for up to K clusters. In many embodiments, each k-cluster profile can represent a clustering of the distribution centers (e.g., 361-365) into k distribution center clusters. In several embodiments, for each demand zone (z), inventory system 320 can determine a closest distribution center cluster in each k-cluster profile, which can be represented by $p^{(k)}(z)$. In many embodiments, inventory system 320 can determine the distance from demand zone (z) to the closest distribution center cluster by computing by an average zone distance ($l^{(k)}(z)$) from demand zone (z) to the distribution centers (e.g., 361-365) in the closest distribution center cluster ($p^{(k)}(z)$).

Figure 4:
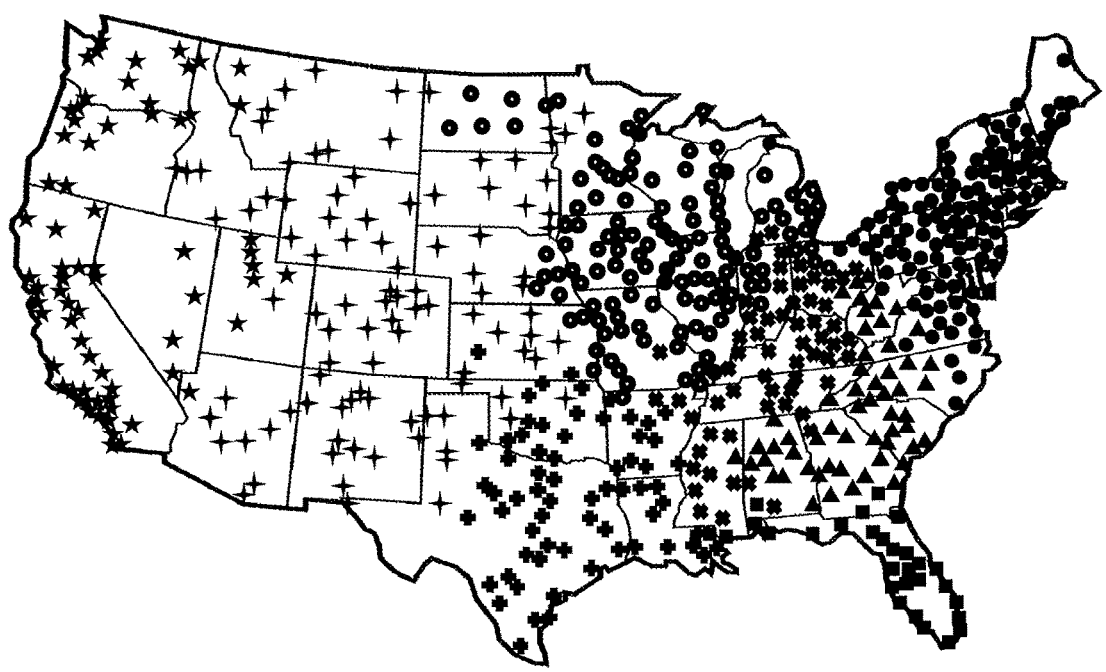
FIG. 4 illustrates an exemplary map of the contiguous United States showing a greedy demand assignment of demand zones for 8 distribution center clusters.

In several embodiments, part of developing a good inventory mirroring plan can be determining the value of stocking a distinct item (i) at a particular number of distribution center clusters. In a number of embodiments, for each distinct item (i) and for each possible number of k distribution center clusters, inventory system 320 can determine a total shipping cost $c_i^{(k)}$ of fulfilling the demand over all of the demand zones. Solving exactly the number of distribution centers at which to mirror a distinct item (i) in order to minimize the total shipping cost given the time-static geo-demand distributions ($\beta_{i,z}$) of each distinct item (i) at each demand zone (z) can be nondeterministic polynomial-tithe NP-hard in general, which can be intractable, even assuming distribution centers with extra capacity and a time-static geo-demand distribution. As such, inventory system 320 can approximate the total shipping cost ci (k) using the k distribution center clusters. For tractably computing an approximate total shipping cost for mirroring a distinct item (i) in k distribution center clusters, inventory system 320 can first greedily assign the demand at each demand zone (z) to the closest distribution center cluster, as described above. For example, FIG. 4 illustrates a map of the contiguous United States showing a greedy demand assignment of the demand zones (z) for eight distribution center clusters. Each item on the map represents a demand zone (z), and is a location of a representative ZIP code of the demand zone (z). A shown in FIG. 4, each demand zone (z) is assigned to one of eight distribution center clusters, each of which represented by a different shape. Note that if the distribution centers have extra capacity, this greedy scheme can be optimal at the cluster level.

In several embodiments, inventory system 320 (FIG. 3) can compute the total shipping cost for each distinct item (i) over k distribution center clusters by $c_i^{(k)} = \Sigma_z d_{i,z} c(1^{(k)}(z), w_i)$, where $w_i$ is the shipping weight of distinct item (i). In many embodiments, inventory system 320 (FIG. 3) can compute a solution value of the number of clusters (k) that minimizes a sum of a total shipping cost ($c_i^{(k)}$) of each distinct item (i), subject to a total distinct item capacity (M). The solution value for each distinct item (i) can be the mirroring factor used for distinct item (i). Each of the distribution centers (e.g., 361-365 (FIG. 3)) in fulfillment network 360 (FIG. 3) can have a distinct item capacity, and/or each of the distinct item capacities can be totaled to compute a total distinct item capacity (M).

In many embodiments, inventory system 320 (FIG. 3) can determine the solution value of the number of clusters (k) for each distinct item (i) by solving an integer programming formulation. For example, a binary variable for whether or not to mirror distinct item (i) in k distribution center clusters can be represented by $x_i^{(k)}$. In many embodiments, because only one mirroring decision can be made for each distinct item (i), $\Sigma_{k=1}^{K} x_i^{(k)} = 1$. The approximate optimal shipping cost resulting from stocking distinct item (i) at k distribution center clusters can be $c_i^{(k)}$, as described above. The total number of slots that can be occupied in the k distribution center clusters can be $\Sigma_{i=1}^{N} \Sigma_k^{K} k x_i^{(k)}$, which can be capped by the total distinct item capacity (M) of fulfillment network 360 (FIG. 3). In many embodiments, the number of distinct items (i) in the set of distinct items can be represented by N. In many embodiments, the goal of solving this problem can be to minimize the sum of the total shipping cost of each distinct item (i) subject to the above constraints. The integer programming formulation can be formally stated as follows:

$$\min_x \sum_{i=1}^{N} \sum_{k}^{K} c_i^{(k)} x_i^{(k)} \quad (1)$$

subject to:

$$\sum_{k=1}^{K} x_i^{(k)} = 1, \text{ for each } i = 1, \ldots, N$$

$$\sum_{i=1}^{N} \sum_{k}^{K} k x_i^{(k)} \leq M$$

$$x_i^{(k)} \in \{0, 1\}$$

In many embodiments, inventory system 320 (FIG. 3) can determine the values of $x_i^{(k)}$ in formulation 1 that satisfy the integer programming formulation. For each distinct item (i), the value of k in which $x_i^{(k)}$ is 1 can be the number of distribution center clusters in which to mirror distinct item (i), or in other words, the mirroring factors for distinct item (i). In many embodiments, inventory system 320 (FIG. 3) can solve formulation 1 using an optimization solver, such as Gurobi, or another suitable optimization solver. In many embodiments, inventory system 320 (FIG. 3) can determine the solution value of the number of clusters (k) for each distinct item (i) that lowers or minimizes the sum of the total shipping cost ($c_i^{(k)}$) of each distinct item (i), subject to the total distinct item capacity (M) of fulfillment network 360 (FIG. 3).

As described above, inventory system 320 (FIG. 3) can determine the solution values based on shipping cost. As a result, there can be cases in which light-weight items can be assigned low mirroring even though their selling velocity (e.g., sales volume) can be quite high because the incremental cost saving can be small compared to that for other heavier items. This can be reasonable from a cost perspective, but can be undesirable from a time-in-transit (TNT) perspective. In various embodiments of fulfillment network configurations, there can be a lower bound on the number of mirrored distribution center clusters for the demand of a distinct item (i) to be fulfilled through shipping within a time limit, e.g., two days. This lower bound on the number of distribution center clusters can be denoted by $K_{TNT}$. In some embodiments, inventory system 320 (FIG. 3) can allow an explicit constraint that all high-velocity items be mirrored for at least $K_{TNT}$ distribution center clusters. The set of high-velocity items of the set of distinct items can be denoted by $\Omega_{high}$.

In a number of embodiments, low-velocity items may occasionally be assigned a higher-than-expected mirroring factor due to their high weight, which can correspond to high cost sensitivity. In some embodiments, inventory system 320 (FIG. 3) can allow an explicit cap on the number of mirrored distribution centers for low-velocity items. This lower bound on the number of distribution center clusters can be denoted by $K_{low}$. The set of low-velocity items of the set of distinct items can be denoted by $\Omega_{low}$.

In many embodiments, an integer programming formulation that includes the constraints described above can be formally stated as follows:

$$\min_x \sum_{i=1}^{N} \sum_{k}^{K} c_i^{(k)} x_i^{(k)} \quad (2)$$

subject to:

$$\sum_{k=1}^{K_{low}} x_i^{(k)} = 1, i \in \Omega_{low}$$

$$\sum_{k=K_{TNT}}^{K} x_i^{(k)} = 1, i \in \Omega_{high}$$

$$\sum_{k=1}^{K} x_i^{(k)} = 1, \text{ for each } i = 1, \ldots, N$$

$$\sum_{i=1}^{N} \sum_{k}^{K} k x_i^{(k)} \leq M$$

$$x_i^{(k)} \in \{0, 1\}$$

In many embodiments, inventory system 320 (FIG. 3) can determine the values of $x_i^{(k)}$ in formulation 2 that satisfy the integer programming formulation. For each distinct item (i), the value of k in which $x_i^{(k)}$ is 1 can be the number of distribution center clusters in which to mirror distinct item (i). In many embodiments, inventory system 320 (FIG. 3) can solve formulation 2 using an optimization solver, such as Gurobi, or another suitable optimization solver.

In some instances, one or more distribution centers (e.g., 361-365 (FIG. 3)) can have a significantly larger capacity than the rest of the distribution centers (e.g., 361-365 (FIG. 3)). For example, there can be a combo distribution center that can be able to carry all of the distinct items (i) in the set of distinct items. In such instances, special treatment of the larger distribution centers can be helpful. In essence, because this combo distribution center can carry all of the distinct items (i), it can be unnecessary to make a decision on whether or not to mirror each of the distinct items (i) in this large distribution center. If not treated as a special case, the capacity of this large distribution center can skew the determination of the mirroring factors, as the extra capacity can support at most one additional mirroring for each distinct items (i), but this capacity can be unavailable to any other distribution centers and/or distribution center clusters. As such, in some embodiments each of the distribution centers included in the clustering can have a distinct item capacity of less than the number of distinct items (i) in the set of distinct items, and those distribution centers that are able to hold all of the distinct items (i) can be removed from the mirroring factor determination.

In some embodiments, such as when the number of distinct items (i) in the set of distinct items is very large, the linear integer programming problems described above can be solved more quickly by implement a bucketing strategy for consolidating the distinct items (i). In a number of embodiments, inventory system 320 (FIG. 3) can segment the distinct item (i) into buckets based on velocity (e.g., sales demand), weight, and/or product type. In many embodiments, the distinct items (i) that are assigned to the same bucket can share the same mirroring factor. For example, a bucket include the distinct items (i) having a sales velocity of 10-20 units per week, a weight of 5-10 pounds, and the same product type, such as "dog food." In several embodiments, with careful segmentation of velocity and weight, inventory system 320 can drastically reduce the size of the optimization problem without compromising too much optimality. With the bucketing strategy, the integer programming formulation (1) can be modified as follows:

$$\min_x \sum_{b=1}^{J} \sum_{k}^{K} c_b^{(k)} x_b^{(k)} \quad (3)$$

subject to:

$$\sum_{k=1}^{K} x_b^{(k)} = 1, \text{ for each } b = 1, \ldots, J$$

$$\sum_{b=1}^{J} \sum_{k}^{K} |B_b| k x_b^{(k)} \leq M$$

$$x_b^{(k)} \in \{0, 1\},$$

where J is a size of the set of buckets; $|B_b|$ is a size of bucket b; and $x_b^{(k)}$ is a binary representation of whether the number of clusters (k) is the solution value of the number of clusters (k) for bucket (b).

In many embodiments, inventory system 320 (FIG. 3) can determine the values of $x_b^{(k)}$ in formulation 3 that satisfy the integer programming formulation. For each bucket (b), the value of k in which $x_b^{(k)}$ is 1 can be the number of distribution center clusters in which to mirror each distinct item (i) in bucket (b). In many embodiments, inventory system 320 (FIG. 3) can solve formulation 3 using an optimization solver, such as Gurobi, or another suitable optimization solver.

In many embodiments, the optimization solver never does not need to branch as it does for a general mixed-integer programming problem. In other words, the linear programming solution to integer programing formulations (1), (2), and/or (3) with the binary constraints ignored nonetheless have binary integer solutions. In several embodiments, the minimum extreme point where the optimal solution of the linear programming problems lies can be at an integer grid point, which can be a highly desirable feature because the complexity of the method can be practically equivalent to that of a linear programming problem. In a number of embodiments, the optimization problem can be solved in less than 30 seconds.

The above description is one of several methods by which SKUs can be allocated to one or more distribution centers using a mirroring algorithm. Other methods can also be used. The result of such an algorithm is a clustering of distribution centers, where the clustering can be different for each SKU. The allocation plan allocates each SKU to a number of different distribution centers, one distribution center in each cluster. Each cluster can contain one or more distribution centers.

However, such an allocation plan might not be adaptable to changes. For example, an unexpected increase or decrease in demand or the inability of one or more distribution centers to cope with the number of orders being processed can lead to the allocation plan not being feasible.

For example, there may be a situation in which a particular SKU is to be allocated to five specific distribution centers (in other words, the SKU has a mirroring of 5). However, before the order is placed and the orders are allocated to the selected distribution centers, one or more of the specific distribution centers no longer has the capacity to store the SKU. In the past, such a situation can result in the failure of the order. It can be desirable to have a method or system that can allow a retailer to reallocate SKUs to different distribution centers based on a number of different factors.

Figure 5:
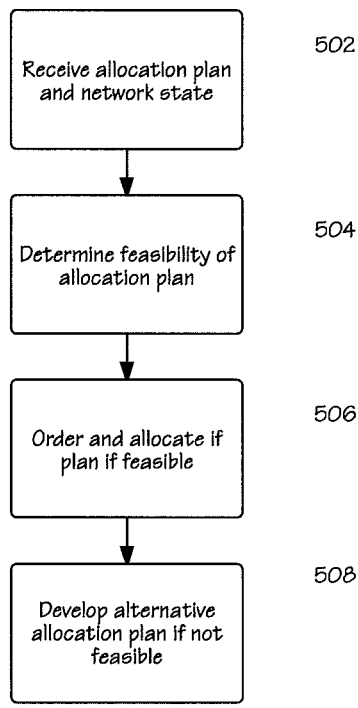
FIG. 5 illustrates a flow chart for an exemplary method of determining an inventory mirroring plan for a set of distinct items in a fulfillment network, according to an embodiment.

Turning ahead in the drawings, FIG. 5 illustrates a flow chart for a method 500 of reallocating an item, according to an embodiment. The fulfillment network can be similar or identical to fulfillment network 360 (FIG. 3). Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. In some embodiments, method 500 can be implemented by inventory system 320 (FIG. 3) and/or order system 310 (FIG. 3). In a number of embodiments, the fulfillment network can include a plurality of distribution centers. The plurality of distribution centers can be similar or identical to distribution centers 361-365 (FIG. 3). In some embodiments, any number of distribution centers can be used. In some embodiments, a quantity of the plurality of distribution centers in the fulfillment network can be greater than 30.

Method 500 can be executed for each SKU in a set of SKUs. At block 502, an allocation plan P and a network state S are received. At block 504, it is determined if allocation plan P is feasible or not, based on the network state S. The determination of the feasibility of an allocation plan can involve a variety of different steps. For example, allocation plan P might involve the shipment and storage of goods at a number of different distribution centers f. An allocation plan might be considered infeasible if any one of the distribution centers lacks capacity to store or distribute the SKU in question. There can be a variety of different reasons for a distribution center to be unable to store or distribute a SKU. For example, a distribution center might lack capacity to store additional items. When the forecast is made, a distribution center may have had room to store the SKU. However, by the time the order is placed, the distribution center may have reached or exceeded capacity. In another example, a distribution center might be unable to receive the SKU due to manpower issues, weather issues, or other unplanned events. For example, a snow storm or a hurricane might make a distribution center unable to receive or process new orders.

Thus, block 504 can involve examining network state S to determine the status of each distribution center in allocation plan P. For a SKU that is to be allocated to five different distribution centers, if any one or more of the distribution centers is unable to store or distribute the SKU in question, for any reason, allocation plan P might be considered infeasible.

If allocation plan P is feasible, then the given SKU is ordered and allocated according to allocation plan P (block 506). Otherwise, an alternative allocation plan P* is developed (block 508). The development of alternative allocation plan P* is detailed below.

Figure 6:
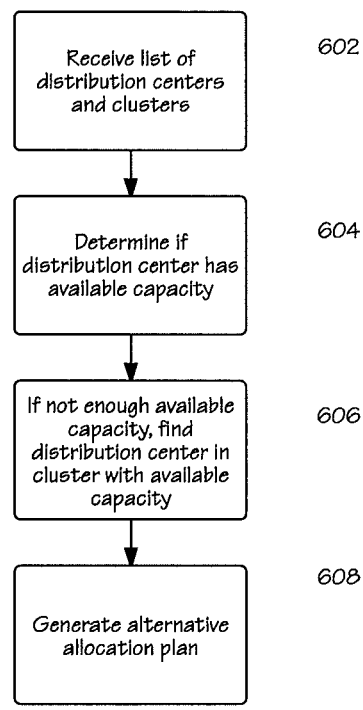
FIG. 6 illustrates a flow chart for an exemplary method of adjusting an inventory mirroring plan for a set of distinct items in a fulfillment network, according to an embodiment.

Turning ahead in the drawings, FIG. 6 illustrates a flow chart for a method 600 of developing an alternative allocation plan P*, according to an embodiment. The fulfillment network can be similar or identical to fulfillment network 360 (FIG. 3). Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 500 can be combined or skipped. In some embodiments, method 600 can be implemented by inventory system 320 (FIG. 3) and/or order system 310 (FIG. 3). In a number of embodiments, the fulfillment network can include a plurality of distribution centers. The plurality of distribution centers can be similar or identical to distribution centers 361-365 (FIG. 3). In some embodiments, any number of distribution centers can be used. In some embodiments, a quantity of the plurality of distribution centers in the fulfillment network can be greater than 30.

In some embodiments, method 600 can be executed after block 508 (FIG. 5), when it is determined that a new allocation plan should be developed. A list of distribution centers (f) and clusters (c) to which the SKU was allocated is retrieved from allocation plan P (block 602). For each distribution center in the list of distribution centers, it is determined if the chosen distribution center has available capacity for the allocation plan (block 604). Determining if a distribution center has available capacity can be similar to the process used to determine if a distribution center is feasible, described above.

If the chosen distribution center does not have available capacity, then the other distribution centers in the same cluster are examined to find a distribution center with available capacity. Once a second distribution center is found that has available capacity, it replaces the first distribution center in the allocation plan (block 606): This process is iterated until a distribution center with available capacity is found or until all the distribution centers in a cluster have been analyzed. If all the distribution centers in a cluster have been analyzed and none of them have enough capacity for the allocation, the distribution centers are removed from the allocation plan. At this point, the allocation plan P can be considered a failure with respect to the SKU in question.

Once the above is completed for every distribution center in the original allocation plan, the result can be an alternative allocation plan that possibly features different distribution centers from the original allocation plan (block 608). Thereafter, orders can be placed and allocated according to the alternative allocation plan, in a similar manner as described above. If the allocation plan was a failure, the lack of a working allocation plan can be noted. There are a variety of different actions that can take place if an allocation plan fails. In many instances, the infeasibility of a particular distribution center is temporary. Merely executing method 500 at a later time can result in an allocation plan that works. In other instances, a new allocation plan can be developed using one of a variety of different mirroring techniques.

Figure 7:
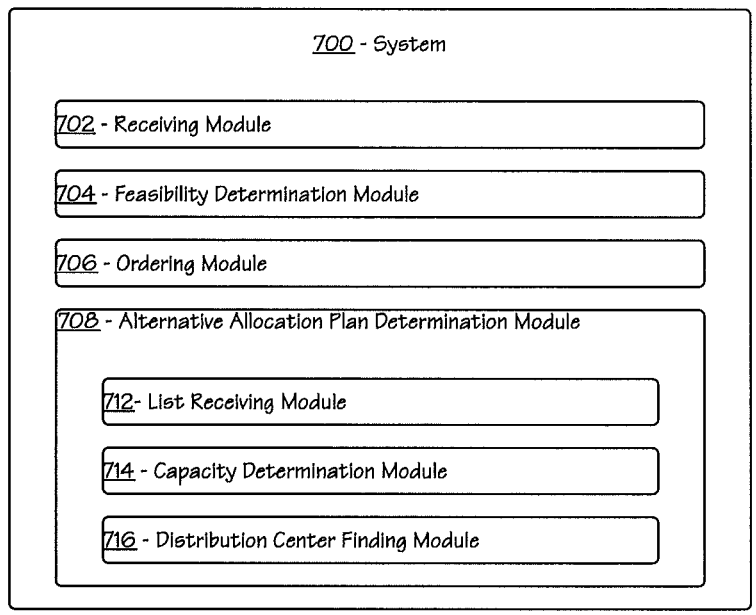
FIG. 7 illustrates a block diagram of an example of an inventory system, according to the embodiment of FIGS. 5 and 6.

Turning ahead in the figures, FIG. 7 illustrates a block diagram of a system 700 that is capable of performing disclosed embodiments. System 700 is merely exemplary and is not limited to the embodiments presented herein. System 700 can be employed in many different embodiments or examples not specifically depicted or described herein. In some embodiments, certain elements or modules of system 700 can perform various procedures, processes, and/or acts. In other embodiments, the procedures, processes, and/or acts can be performed by other suitable elements or modules.

In a number of embodiments, system 700 can include receiving module 702. In certain embodiments, receiving module 702 can perform block 502 (FIG. 5) of receiving an allocation plan and a network state.

In a number of embodiments, system 700 can include feasibility determination module 704. In certain embodiments, feasibility determination module 704 can perform block 504 (FIG. 5) of determining if an allocation plan is feasible.

In a number of embodiments, system 700 can include ordering module 706. In certain embodiments, ordering module 706 can perform block 506 (FIG. 5) of ordering and allocating according to the allocation plan.

In a number of embodiments, system 700 can include alternative allocation plan determination module 708. In certain embodiments, alternative allocation plan determination module 708 can perform block 508 (FIG. 5) of developing an alternative allocation plan.

In a number of embodiments, alternative allocation plan determination module 708 can include list receiving module 712. In certain embodiments, list receiving module 712 can perform block 602 (FIG. 6) of receiving a list of distribution centers and a list of clusters.

In a number of embodiments, alternative allocation plan determination module 708 can include capacity determination module 714. In certain embodiments, capacity determination module 714 can perform block 604 (FIG. 6) of determining if a distribution center has available capacity.

In a number of embodiments, alternative allocation plan determination module 708 can include distribution center finding module 716. In certain embodiments, distribution center finding module 716 can perform block 606 (FIG. 6) of finding a second distribution center that has available capacity.

Another embodiment can be arranged to smartly allocate SKUs to distribution centers, taking existing inventory to account. To take a simple example, there might be a situation where a SKU to be distributed to various distribution centers. An allocation of inventory might determine that the SKU should be distributed to two different distribution centers, DC1 and DC2, at a 40%/60% split, with 40% of the SKUs being sent to DC1 and 60% of the SKUs being sent to DC2.

If there is a shipment of 170 units to be sent to DC1 and DC2, systems of the prior art might send 68 units to DC1 and 102 units to DC2 because that is a 40/60 split between the two distribution centers. However, prior to shipping the 170 units, there might be a pre-existing amount of 30 units at DC1 and 0 units at DC2. The result would thus be 98 units at DC1 and 102 units at DC2, which is not the optimum distribution of the SKU to DC1 and DC2. This can result in greater than forecast shipping costs and shipping times.

Embodiments described herein can take into account the existing inventory when allocating the new units. Instead of merely dividing the new order of 170 units to DC1 and DC2, an embodiment, can determine the total stock on hand including the new order. Thereafter, the SKU and be allocated to DC1 and DC2 based on the new total.

In the above example, instead of determining the split between DC1 and DC2 using the 170 unit order, the 170 unit order is added to the 30 units on hand to come up with 200 total units. Then the 200 total units are divided between DC1 and DC2 according to the optimum split of 40/60.

Here, the 40/60 split of 200 units means a total of 80 units at DC1 and 120 units at DC2. The stock on hand is subtracted from these totals to determine the proper allocation. 80 total units at DC1−30 stock on hand equals 50 units to be allocated to DC1, with the remaining 120 units being allocated to DC2.

In some embodiments, the allocation can be divided into various shipments. For example, it might be determined that the 200 units are the projected demand for a quarter. Therefore, the allocations can be divided into smaller shipments, such as monthly shipments, weekly shipments, or shipments at a different schedule.

Simulations of the above-described embodiments have shown a significant improvement for a retail business. For example, an order failure rate (the inability to place an order due to constraints present at a distribution center) goes down from 18% to 8% using embodiments described above. The ability to meet demand goes up from 89% to 91%.

Although determining an inventory allocation plan has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIGS. 1-7 may include different procedures, processes, and/or activities and be performed by many different modules, in many different orders. As another example, the modules within inventory system 320 in FIG. 1-7 can be interchanged or otherwise modified.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system having improved processing time comprising:
   one or more processors; and
   one or more non-transitory memory storage devices storing computing instructions configured to run on the one or more processors and perform acts of:
      receiving an allocation plan for an item in a fulfillment network, the fulfillment network comprising a plurality of clusters of distribution centers, wherein:
         each cluster of distribution centers of the plurality of clusters of distribution centers comprises one or more distribution centers;
         the plurality of clusters contribute to the improved processing time; and
         the allocation plan is created by estimating demand for the item and utilizing mirroring techniques based on:
            (1) the demand, as estimated and as collected in real time and from multiple sources;
            (2) a weight of the item; and
            (3) a selling velocity of the item;
      storing the allocation plan in the one or more non-transitory memory storage devices;
      determining:
         when the allocation plan is feasible; and
         when the allocation plan is not feasible;
      when the allocation plan is determined to be feasible, automatically shipping the item to the one or more distribution centers of the plurality of clusters of distribution centers based on the allocation plan; and
      when the allocation plan is determined to be not feasible:
         determining an alternative allocation plan;
         storing the alternative allocation plan in the one or more non-transitory memory storage devices; and
         after determining the alternative allocation plan, automatically shipping the item to the one or more distribution centers of the plurality of clusters of distribution centers based on the alternative allocation plan.

2. The system of claim 1, wherein determining the alternative allocation plan comprises:
   receiving a list of distribution centers that are part of the allocation plan;

for each distribution center in the list of distribution centers, determining at least one of:
when a distribution center in the list of distribution centers is feasible; or
when the distribution center in the list of distribution centers is not feasible; and
for each distribution center in the list of distribution centers when the distribution center in the list of distribution centers is not feasible:
determining a cluster in which the distribution center in the list of distribution centers is located;
determining an alternative distribution center in the list of distribution centers that is located in within the cluster;
determining when the alternative distribution center in the list of distribution centers is feasible; and
when the alternative distribution center in the list of distribution centers is feasible, replacing the distribution center in the list of distribution centers in the cluster with the alternative distribution center in the list of distribution centers.

3. The system of claim 2, wherein determining when the alternative distribution center in the list of distribution centers is feasible comprises:
analyzing a status of the alternative distribution center in the list of distribution centers to determine a total capacity and a used capacity;
comparing the used capacity of the alternative distribution center in the list of distribution centers to the total capacity of the alternative distribution center in the list of distribution centers to determine an available capacity; and
determining when the available capacity of the alternative distribution center in the list of distribution centers is sufficient for an allocation under the alternative allocation plan to the alternative distribution center in the list of distribution centers.

4. The system of claim 3, wherein:
analyzing the status of the alternative distribution center in the list of distribution centers further comprises adjusting the total capacity for unplanned events.

5. The system of claim 4, wherein:
the unplanned events include weather-related events and manpower-related events.

6. The system of claim 2, wherein determining when the allocation plan is not feasible comprises:
notating a failure of the allocation plan when there is no distribution center within the cluster of distribution centers that is feasible.

7. The system of claim 1, wherein:
the fulfillment network is utilized by a retailer to distribute goods to consumers; and
the allocation plan is arranged to distribute the goods through the fulfillment network to result in a distribution of lower shipping costs to consumers.

8. A method being implemented via execution of computing instructions configured to run at one or more processors and configured to be stored at non-transitory computer-readable media, the method having improved processing time and comprising:
receiving an allocation plan for an item in a fulfillment network, the fulfillment network comprising a plurality of clusters of distribution centers, wherein:
each cluster of distribution centers of the plurality of clusters of distribution centers comprises one or more distribution centers;
the plurality of clusters contribute to the improved processing time;
the allocation plan is created by estimating demand for the item and utilizing mirroring techniques based on:
(1) the demand, as estimated and as collected in real time and from multiple sources;
(2) a weight of the item; and
(3) a selling velocity of the item;
storing the allocation plan in the non-transitory computer-readable media;
determining:
when the allocation plan is feasible; and
when the allocation plan is not feasible;
when the allocation plan is determined to be feasible, automatically shipping the item to the one or more distribution centers of the plurality of clusters of distribution centers based on the allocation plan; and
when the allocation plan is determined to be not feasible:
determining an alternative allocation plan;
storing the alternative allocation plan in the non-transitory computer-readable media; and
after determining the alternative allocation plan, automatically shipping the item to the one or more distribution centers of the plurality of clusters of distribution centers based on the alternative allocation plan.

9. The method of claim 8, wherein determining the alternative allocation plan comprises:
receiving a list of distribution centers that are part of the allocation plan;
for each distribution center in the list of distribution centers, determining at least one of:
when a distribution center in the list of distribution centers is feasible; or
when the distribution center in the list of distribution centers is not feasible; and
for each distribution center in the list of distribution centers, when the distribution center in the list of distribution centers is not feasible:
determining a cluster in which the distribution center in the list of distribution centers is located;
determining an alternative distribution center in the list of distribution centers that is located in within the cluster;
determining when the alternative distribution center in the list of distribution centers is feasible; and
when the alternative distribution center in the list of distribution centers is feasible, replacing the distribution center in the list of distribution centers in the cluster with the alternative distribution center in the list of distribution centers.

10. The method of claim 9, wherein determining when the alternative distribution center in the list of distribution centers is feasible comprises:
analyzing a status of the alternative distribution center in the list of distribution centers to determine a total capacity and a used capacity;
comparing the used capacity of the alternative distribution center in the list of distribution centers to the total capacity of the alternative distribution center in the list of distribution centers to determine an available capacity; and
determining when the available capacity of the alternative distribution center in the list of distribution centers is sufficient for an allocation under the alternative allocation plan to the alternative distribution center in the list of distribution centers.

11. The method of claim 10, wherein:
analyzing the status of the alternative distribution center in the list of distribution centers further comprises adjusting the total capacity for unplanned events.

12. The method of claim 11, wherein:
the unplanned events include weather-related events and manpower-related events.

13. The method of claim 9 further comprising:
notating a failure of the allocation plan when there is no distribution center within the cluster of distribution centers that is feasible.

14. The method of claim 8, wherein:
the fulfillment network is utilized by a retailer to distribute goods to consumers; and
the allocation plan is arranged to distribute the goods through the fulfillment network to result in a distribution of lower shipping costs to consumers.

15. A method being implemented via execution of computing instructions configured to run at one or more processors and configured to be stored at non-transitory computer-readable media, the method having improved processing time and comprising:
receiving an allocation plan for an item in a fulfillment network, the fulfillment network comprising a plurality of clusters of distribution centers, wherein:
each cluster of distribution centers of the plurality of clusters of distribution centers comprises one or more distribution centers;
the plurality of clusters contribute to the improved processing time;
the allocation plan is created by estimating demand for the item and utilizing mirroring techniques based on:
(1) the demand, as estimated and as collected in real time and from multiple sources;
(2) a weight of the item; and
(3) a selling velocity of the item; and
the allocation plan comprises placing one or more copies of each item into a first distribution center and one or more copies of each item into a second distribution center;
storing the allocation plan in the non-transitory computer readable media;
determining an existing inventory at the first distribution center and an existing inventory at the second distribution center;
adjusting the allocation plan based on the existing inventory at the first distribution center and the existing inventory at the second distribution center;
storing the allocation plan, as adjusted, in the non-transitory computer readable media; and
automatically shipping the item to the one or more distribution centers of the plurality of clusters of distributions centers based on the allocation plan, as adjusted.

16. The method of claim 15, wherein adjusting the allocation plan comprises:
extracting a planned allocation for the first distribution center from the allocation plan;
extracting a planned allocation for the second distribution center from the allocation plan;
adding the planned allocation for the first distribution center, the planned allocation for the second distribution center, the existing inventory at the first distribution center, and the existing inventory at the second distribution center to result in a total; and
dividing the total between the first distribution center and the second distribution center based on the allocation plan to result in an adjusted allocation plan.

17. The method of claim 15, wherein adjusting the allocation plan further comprises:
dividing the allocation plan into two or more allocations of a subset of the allocation plan, as adjusted.

18. The method of claim 15, wherein:
the fulfillment network is utilized by a retailer to distribute goods to consumers; and
the allocation plan is arranged to distribute the goods through the fulfillment network to result in a distribution of lower shipping costs to consumers.

19. The system of claim 1, wherein the allocation plan comprises:
estimating a location specific demand for an item (i) at a demand zone (z) using an equation comprising:

$$d_{i,z} = d_i \beta_{i,z}$$

wherein $d_{i,z}$ is the location specific demand, $d_i$ is a total demand, and $\beta_{i,z}$ is a time-static geo-demand distribution.

20. The system of claim 1, wherein:
automatically shipping the item to the one or more distribution centers of the plurality of clusters of distribution centers based on the allocation plan comprises allowing the item to be shipped from a first distribution center to a second distribution center different than the first distribution center; and
automatically shipping the item to the one or more distribution centers of the plurality of clusters of distribution centers based on the alternative allocation plan comprises allowing the item to be shipped from the first distribution center to the second distribution center.

21. The method of claim 8, wherein the allocation plan comprises:
estimating a location specific demand for an item (i) at a demand zone (z) using an equation comprising:

$$d_{i,z} = d_i \beta_{i,z}$$

wherein $d_{i,z}$ is the location specific demand, $d_i$ is a total demand, and $\beta_{i,z}$ is a time-static geo-demand distribution.

22. The method of claim 8, wherein:
automatically shipping the item to the one or more distribution centers of the plurality of clusters of distribution centers based on the allocation plan comprises allowing the item to be shipped from a first distribution center to a second distribution center different than the first distribution center; and
automatically shipping the item to the one or more distribution centers of the plurality of clusters of distribution centers based on the alternative allocation plan comprises allowing the item to be shipped from the first distribution center to the second distribution center.

23. The method of claim 15, wherein the allocation plan comprises:
estimating a location specific demand for an item (i) at a demand zone (z) using an equation comprising:

$$d_{i,z} = d_i \beta_{i,z}$$

wherein $d_{i,z}$ is the location specific demand, $d_i$ is a total demand, and $\beta_{i,z}$ is a time-static geo-demand distribution.

24. The method of claim 15, wherein automatically shipping the item to the one or more distribution centers of the plurality of clusters of distribution centers based on the adjusted allocation plan comprises allowing the item to be shipped from a first distribution center to a second distribution center different than the first distribution center.

* * * * *